Figure 1:
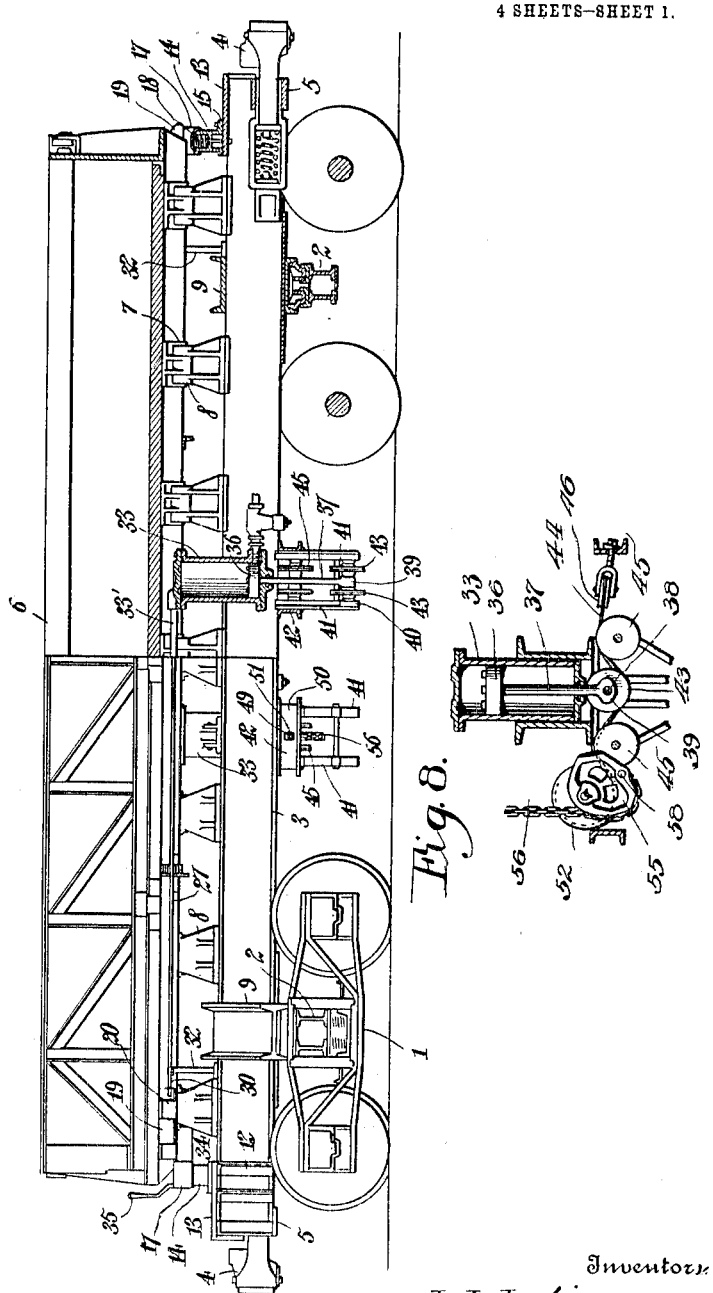

J. J. IRVIN & W. SHEPPARD.
CAR DUMPING DEVICE.
APPLICATION FILED FEB. 14, 1913.

1,106,220.

Patented Aug. 4, 1914.
4 SHEETS—SHEET 3.

Witnesses:
Christ Feinle, Jr.
R. M. Smith

Inventors
J. J. Irvin,
William Sheppard,
By Victor J. Evans,
Attorney

THE NORRIS PETERS CO., PHOTO-LITHO., WASHINGTON, D. C.

J. J. IRVIN & W. SHEPPARD.
CAR DUMPING DEVICE.
APPLICATION FILED FEB. 14, 1913.

1,106,220.

Patented Aug. 4, 1914.
4 SHEETS—SHEET 4.

Witnesses:
Christ Feinle, Jr.
P. M. Smith.

Inventors,
J. J. Irvin
William Sheppard
By Victor J. Evans,
Attorney.

THE NORRIS PETERS CO., PHOTO-LITHO., WASHINGTON, D. C.

UNITED STATES PATENT OFFICE.

JOHN J. IRVIN AND WILLIAM SHEPPARD, OF BELLWOOD, PENNSYLVANIA.

CAR-DUMPING DEVICE.

1,106,220. Specification of Letters Patent. Patented Aug. 4, 1914.

Application filed February 14, 1913. Serial No. 748,399.

*To all whom it may concern:*

Be it known that we, JOHN J. IRVIN and WILLIAM SHEPPARD, citizens of the United States, residing at Bellwood, in the county of Blair and State of Pennsylvania, have invented new and useful Improvements in Car-Dumping Devices, of which the following is a specification.

This invention relates to dump cars, the object in view being to provide improved mechanism for dumping a car body, returning the same to its normal loaded position and locking the body in position for transportation and loading, the aim of the invention being to provide mechanism of such nature as to enable the operations referred to to be economically effected with a minimum amount of air pressure, also reducing the amount of labor required in dumping and righting the car body, and also effecting a saving in the materials and parts required.

The operation of dumping, as commonly used, is expensive in the consumption of compressed air, by reason of the fact that insufficient leverage is obtained between the air cylinder and the car body, so that the pressure on the air piston is not used to the best advantage in overturning or tilting the car body, in the act of dumping the same. It will be understood that as soon as the body of the car has been slightly tilted on its pivotal or hinge connection with the remainder of the car, the force of gravity will complete the operation. To obtain this initial part of the tilting operation of the car body with the least possible amount of compressed air is one of the aims of the present invention.

Two air pressure cylinders are employed, one performing the operation of dumping the car to the right and the other to the left, and after the car has been dumped by one cylinder, it is righted by the other cylinder, and vice versa. The arrangement commonly employed for preventing the car body from tilting over while being loaded or while in position for transportation, comprises chains which connect the car body to the trucks, and this necessitates the employment of more than one man, as one man could not operate both of the air cylinders, and also handle the holding chains at both ends of the car. By means of the improved construction, hereinafter particularly set forth, one man is enabled to perform both operations simultaneously with a minimum exertion, and at the same time with perfect safety, from a platform at one end of the car, the levers being so arranged that they are entirely out of the way as the car body swings on its pivotal center.

With the above and other objects in view, the invention consists in the construction, combination and arrangement of parts, as will be hereinafter more fully described, illustrated in the accompanying drawings, and pointed out in the claims hereunto appended.

Figure 2:
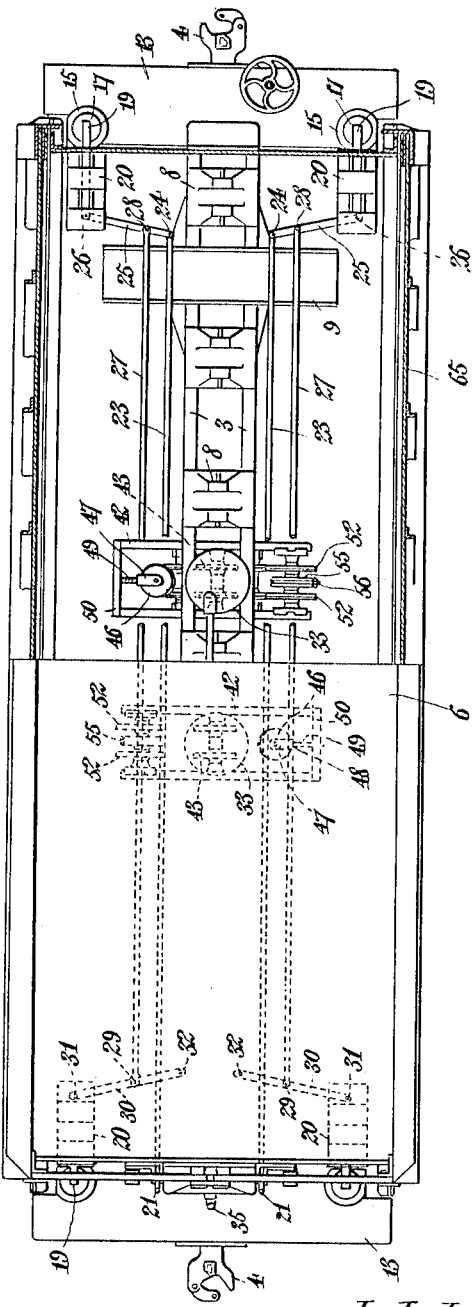
Figure 3:
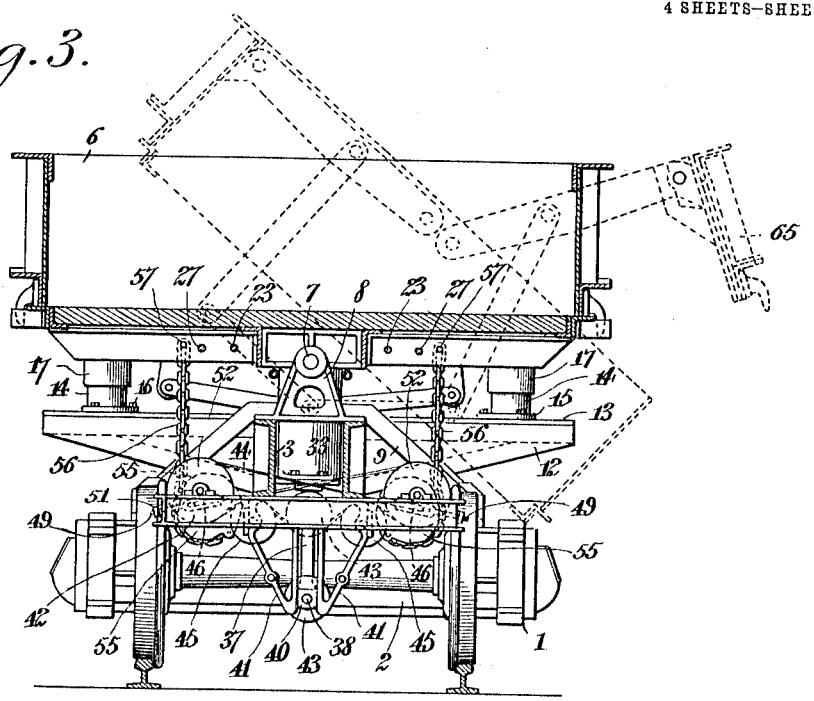
Figure 4:
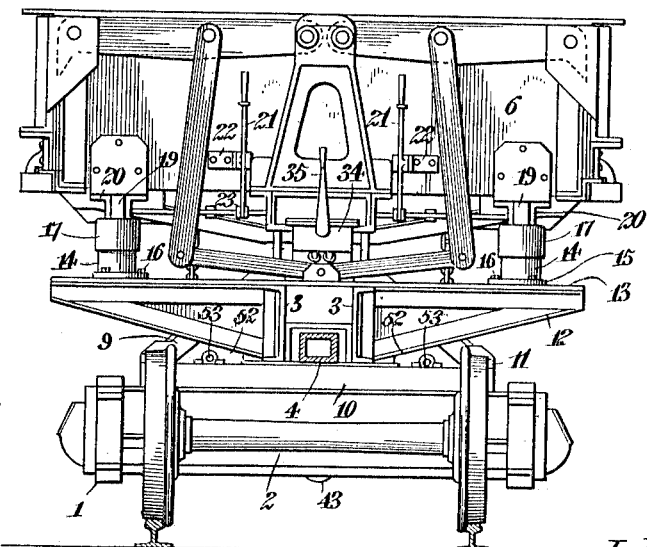
Figure 5:
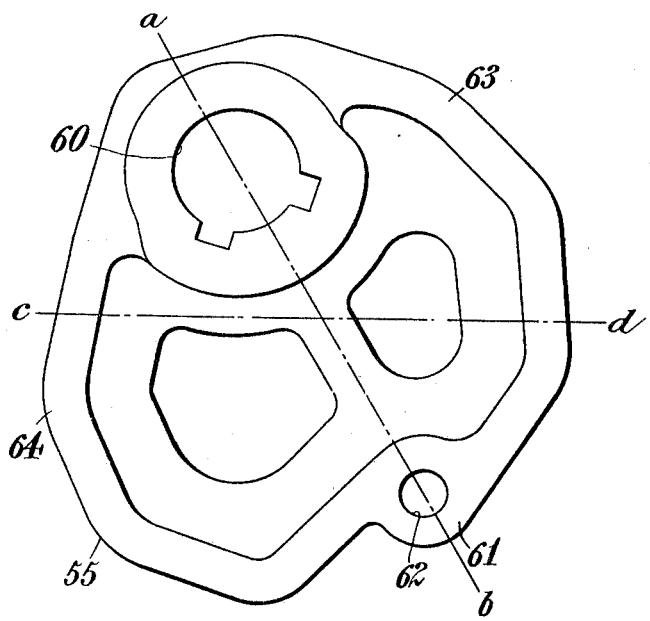
Figure 6:
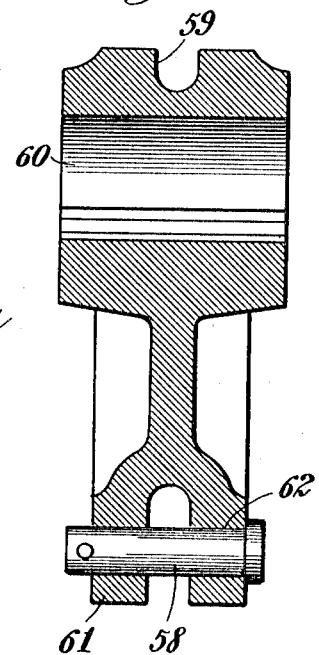
Figure 7:
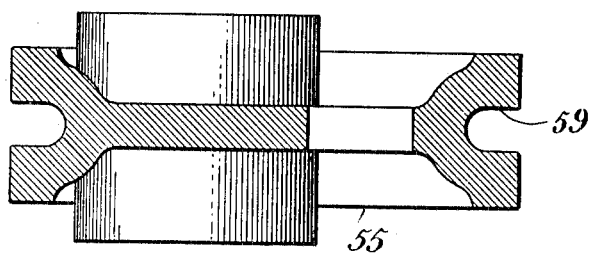

In the drawings: Figure 1 is a side elevation of a dump car, embodying the present invention. Fig. 2 is a plan view of the same. Fig. 3 is a cross section showing the tilting body in its normal position in full lines and the dumping position thereof in dotted lines. Fig. 4 is an end elevation of the dump car. Fig. 5 is an enlarged detail elevation of the chain sheave. Fig. 6 is a detail section on the line *a—b* of Fig. 5. Fig. 7 is a detail section on the line *c—d* of Fig. 5. Fig. 8 is a detail vertical cross section illustrating the relation between the cable and the several pulleys which it engages.

Referring to the drawings, 1 designates a pair of trucks, 2 the truck bolsters, and 3 the draft sills, the said parts being of the usual construction and arrangement, 4 designating the usual draw bars at each end of the truck frame, the same being mounted as usual in the end sills 5 at opposite ends of the draft sills 3.

6 designates the car body which is pivotally mounted, at 7, on a suitable number of brackets 8 supported by the draft sills 3, over which extend arched braces or inverted U-shaped frames 9, one of which is shown in end elevation in the cross sectional view Fig. 3, each of said braces or frames being suitably secured to the draft sills 3 and the truck frame bolsters 2. The end portions of the arched frame bars 9 are secured to a horizontal tie bar 10 which is supported by side bearings 11 on the bolster 2 of the truck frames.

Extending laterally from each side of the draft sills 3 are the supporting members 12 of a fixed horizontal platform 13, upon which the operator stands while manipulating the levers which control the air cylinders and latch operating connections, hereinafter particularly set forth.

In order to support the car body in a normally horizontal position in readiness for loading and transportation, spring buffers are located adjacent to each corner of the car body, as illustrated in Figs. 1 and 2. These spring buffers are located beyond the vertical plane of the path of tilting movement of the car body, so as not to interfere with such tilting movement, when the latches, hereinafter described, are withdrawn. Each of said spring buffers comprises a cylindrical spring container or seat 14 provided with a bottom flange 15 secured by bolts 16, or the equivalent thereof, to the platform 13. A telescopic or vertically sliding cap 17 fits over the upper end of the seat 14, both of the members 14 and 17 being cylindrical in shape and cored out to receive one or more coiled expansion springs 18. The cap 17 forms a yielding support for one of a series of sliding latches or bolts 19, said bolts being mounted to slide under the bottom of the car body, as illustrated in Figs. 1, 3 and 4. These latches are mounted to slide longitudinally in suitable guides 20 secured to the bottom of the car body and are actuated by the following means: At one end of the car body and mounted thereon are two latch operating levers 21, each of which is adapted to operate the two latches on one side of the pivotal center of the tilting body, as illustrated in the plan view Fig. 2. Each lever is fulcrumed, intermediate its ends, on the pivot 22 secured to the outer face of the end wall of the body, as shown in Fig. 4, and connected to the lower arm of said lever is a rod 23, see Figs. 2 and 4, which extends nearly the full length of the car body, said rod being terminally pivoted, at 24, to a latch operating lever 25 which is pivotally attached, at 26, to one of the latches 19. Another rod 27 is pivotally connected to the lever 25, at 28, and extends toward that end of the car on which the lever 21 is mounted, the rod 27 being pivotally connected, at 29, to another latch operating lever 30 which is pivotally attached, at 31, to the other latch 19 on the same side of the pivotal center of the car body, the lever 30 being fulcrumed, at 32, on the adjacent draft sill 3, as shown in Fig. 1. It will now be seen from the description of the latch operating mechanism, that when the lever 21 at one side or the other of the pivotal center of the car body is operated, through the medium of the connections referred to, both of the latches 19 at that side of the car body are drawn toward each other, until they move out of the path of the spring buffers, thereby leaving the car body unsupported at that side, and adapting the car body to be tilted and dumped in a corresponding direction. Two levers 21 and two sets of latches and operating connections are provided, one set at each side of the pivotal center of the car body for enabling the body to be tilted and dumped in either direction.

The mechanism for tilting and resetting the car body comprises two units, one unit serving to tilt the car body in one direction, and the other unit acting to tilt the car body in the opposite direction. Each of said units comprises an air cylinder 33, to which air is led by means of a pipe 33' which enters the casing 34 of a controlling valve which is actuated by means of a hand lever 35 at the same end of the car, as the lever 21, hereinabove described. It may be stated at this point that the valve operated by the lever 35 is arranged to admit air under pressure to either one of two pipes 33' one of which leads to the cylinder 33 of one unit, and the other to the cylinder 33 of the other unit. In each cylinder 33 there is mounted a piston 36, extending downwardly from which is a rigidly attached piston rod 37, the lower end of which carries the shaft 38 of a cross head 39, the ends 40 of which are mounted for vertical sliding movement in a pair of spaced guides 41 secured to a supporting frame 42 extending transversely of the truck frame, and shown as secured to the bottom of the draft sills 3. Journaled on the shaft 38 at opposite sides of the connecting or piston rod 37 are cable operating sheaves 43 which are, therefore, movable up and down with the cross head. Passing under the sheaves 43 is a rope or cable 44 which, at opposite sides of the path of movement of the sheaves 43, passes over the idler or guiding sheaves 45. The central portion of the cable or rope 44 passes around an equalizing sheave 46 which is journaled in the fork 47 of a tension device 48, embodying a threaded shank or stem 49 which passes through an end bar 50 of the frame 42, where it is secured by means of a nut 51, by turning which the cable or rope may be taken up, so as to obtain the proper tension thereon. The ends of the cable or rope 44 are fixedly attached to a pair of sheaves 52 fast on a shaft 53 supported in bearings 54 secured to the transverse frame members 42, as shown in Fig. 3. Fast on the same shaft 53 and turning in unison with the sheaves 52 is a chain sheave 55, as shown in Figs. 1 and 3, and illustrated in detail in Figs. 5, 6 and 7. From this chain sheave 55, a dumping or tilting and resetting chain 56 extends to the car body, to which it is connected at a point 57 at a suitable distance from the center of pivotal movement of the car body. The opposite end of the chain is attached, at 58, to the chain sheave 55. By reference to Figs. 5, 6 and 7, it will be seen that said sheave is cam-shaped, and is also grooved in its outer periphery, as shown at 59, to receive and seat the links of the chain 56. At a point opposite the bore 60 of the chain sheave, the peripheral portion thereof is offset outwardly, as shown at 61, and formed with a hole 62, by means of which the corresponding end of the chain 56 is pinned to the cam-shaped chain sheave. At one side of the center of movement of the sheave 58, the latter is formed with a gradual bulge 63, so that as the chain 56 wraps around the sheave 58, the leverage on the chain will decrease, the arrangement described giving the greatest leverage on the chain in the initial part of the movement of said chain sheave, at which time the greatest power is needed for starting the tilting movement of the car body. As the tilt becomes greater, less leverage is required, as gravity then comes into operation and the remainder of the tilting action of the car body is effected with less power. At the opposite side from the bulging portion 63, the cam-shaped chain sheave 58 is provided with another bulging portion 64, which will take up the slack in the chain 56 to compensate for the amount of movement of the chain 56 of the other tilting and dumping unit.

As the compressed air is let into the top of one of the cylinders 33, by operating the lever 35, the piston 36 is driven downwardly, carrying with it the cross head 39 which slides in the guides 41. At the same time, the operating sheaves 43 are depressed to a corresponding extent, thereby moving both runs of the cable or rope 44 downwardly, the effect of which is to revolve the sheaves 52. This in turn imparts a corresponding movement to the chain sheave 55 and pulls down on the chain 56 at that side of the car body, which has previously been unlocked at the corresponding side by manipulating the appropriate lever 21 and withdrawing the latches 19 at the same side of the body out of the path of the spring buffers, on which said latches normally rest, when the car is in transportation. As previously stated, by reason of the cam-shape of the chain sheave, the latter obtains the greatest leverage on the chain during the initial part of the down pull on the body, thereby conserving the compressed air and utilizing the same to the best advantage, making the device comparatively economical in the consumption of compressed air. After the car body has been partially tilted by the means described, the force of gravity will cause the body to tilt to its full extent, thereby permitting the load to slide laterally from the car body, the door 65 having been automatically opened, during the tilting movement of the body, as indicated by full and dotted lines in Fig. 3. After the car has been dumped, air is admitted to the other cylinder 33, the piston in which is now at the top of the cylinder, and the car is returned to its normal horizontal position, in a manner similar to that in which it was dumped. To dump to the opposite side, the operation is identical to that just described, except that the air is turned into the other cylinder 33 and the latches on the corresponding side withdrawn. The sheave 46 acts as an equalizer for the cable or rope, and also as an anchorage for the same, and in addition thereto it acts in connection with the tension device 48 as an adjusting medium to take up any undue stretch in the rope or cable. The latch operating levers 21 lie within the plane of the structure of the car body, so that the operator cannot be struck thereby, as the body tilts in the dumping operation. After the car body has been returned to its normal position, the latches are again thrown out by means of said levers 21, and stand directly over the spring buffers which thereby form a yielding support for the car body, the buffers in turn being supported by the platform which rests on the draft sills. This prevents the car body from tilting accidentally, and the buffers also act as cushioning devices to absorb shocks during the travel of the car over rough or uneven road beds, preventing the transmission of such shocks to the draft sills. The said buffers also sustain the shock due to righting the car body or returning the same quickly to its normal horizontal position. It will also be seen that each dumping or tilting unit is supported by a unit frame which is self-contained in the structure described and supported by the draft sills.

What is claimed is:

1. A dump car, embodying a pivotally mounted car body, a self-contained frame for the air dumping mechanism, an air cylinder supported by said frame, a piston in said cylinder, a cross head connected with and actuated by said piston, guiding means on said frame for the cross head, sheaves journaled on the cross head, and connections operated by said sheaves for tilting the car body.

2. A dump car, embodying a pivotally mounted car body, a self-contained frame for the air dumping mechanism, an air cylinder supported by said frame, a piston in said cylinder, a cross head connected with and actuated by said piston, guiding means on said frame for the cross head, sheaves journaled on the cross head, a cable actuated by said sheaves for tilting the car body, and cable guiding sheaves on said frame.

3. A dump car, embodying a pivotally mounted car body, a self-contained frame for the air dumping mechanism, an air cylinder supported by said frame, a piston in said cylinder, a cross head connected with and actuated by said piston, guiding means on said frame for the cross head, sheaves journaled on the cross head, a cable actuated by said sheaves, cable driven sheaves journaled on said frame, a chain sheave operated by the last-named sheaves, and a car body tilting chain actuated by the chain sheave.

4. A dump car, embodying a pivotally mounted car body, a self-contained frame for the air dumping mechanism, an air cylinder supported by said frame, a piston in said cylinder, a cross head connected with and actuated by said piston, guiding means on said frame for the cross head, sheaves journaled on the cross head, a cable actuated by said sheaves, cable driven sheaves journaled on said frame, a cam-shaped chain sheave operated by the last-named sheaves, and a car body tilting chain actuated by the chain sheave.

5. A dump car, embodying a pivotally mounted car body, a self-contained frame for the air dumping mechanism, an air cylinder supported by said frame, a piston in said cylinder, a cross head connected with and actuated by said piston, guiding means on said frame for the cross head, sheaves journaled on the cross head, a cable actuated by said sheaves, cable driven sheaves journaled on said frame, a chain sheave operated by the last-named sheaves, and a car body tilting chain actuated by the chain sheave, said chain sheave being shaped to exert a varying leverage on the body tilting chain.

6. A dump car, comprising a truck frame, a tilting and dumping car body, means for tilting said body, spring buffers located outside the vertical plane of the body, latches carried by the body and movable into and out of the plane of the buffers, and body contained latch-operating means.

7. A dump car, comprising a truck frame, a tilting and dumping car body, means for tilting said body, spring buffers located outside the vertical plane of the body and at opposite sides of the pivotal center on which the body tilts, latches carried by the body and movable into and out of the plane of the buffers, and body contained latch-operating means.

In testimony whereof we affix our signatures in presence of two witnesses.

JOHN J. IRWIN.
WILLIAM SHEPPARD.

Witnesses:
GEORGE SCHWENK,
G. E. FUOSS.